May 19, 1925.

M. J. GLAUBER

PARTITION VALVE

Filed June 25, 1924

1,538,284

Inventor
Myron J. Glauber
By Lyon & Lyon
Attorneys

Patented May 19, 1925.

1,538,284

UNITED STATES PATENT OFFICE.

MYRON J. GLAUBER, OF LOS ANGELES, CALIFORNIA.

PARTITION VALVE.

Application filed June 25, 1924. Serial No. 722,284.

*To all whom it may concern:*

Be it known that I, MYRON J. GLAUBER, a citizen of the United States, residing at Los Angeles, in the county of Los Angeles and State of California, have invented new and useful Partition Valves, of which the following is a specification.

This invention relates to partition valves and is more particularly directed to partition valves adapted to be situated between the walls or partitions of a building and being provided with a handle and an escutcheon that may be adjusted in position in relation to the fixed plumbing positioned between the said partitions.

In the construction of partition valves it has been the practice to cast a special valve body having an elongated portion so that the same will project from within the partition of the wall out beyond the said wall. Such a valve body when so cast has been limited in its use in connection with concealed plumbing installations.

This invention comprehends the providing of an elongated connection, with a relatively short body valve which relatively short valve body may be used for many purposes other than in connection with concealed plumbing installations.

The advantage obtained by the use of such a short body valve is that the body of the valve may be made in very large quantities and only a portion of the said quantity need be used in connection with the special fitting provided for use in concealed plumbing installations. Due to this quantity production, the cost of manufacturing this partition valve, for combination with the special fitting, is very greatly reduced.

An object of this invention is to provide fittings adapted for use in connection with a short body valve that are susceptible of a comparatively large adjustment in position.

Another object of this invention is to provide a partition valve provided with valve stem guides spaced a relatively great distance apart.

Another object of this invention is to provide a fitting, for a comparatively short body valve, providing a packing cone recess close to the seat of the said valve.

Another object of this invention is to provide a partition valve which is easily repaired or repacked while in position in the wall.

Another object of this invention is to provide a partition valve having a separate chamber for packing.

Other objects and advantages will be apparent from the following detailed description of a preferred embodiment thereof as illustrated in the accompaying drawings.

In the drawings—

Figure 1:
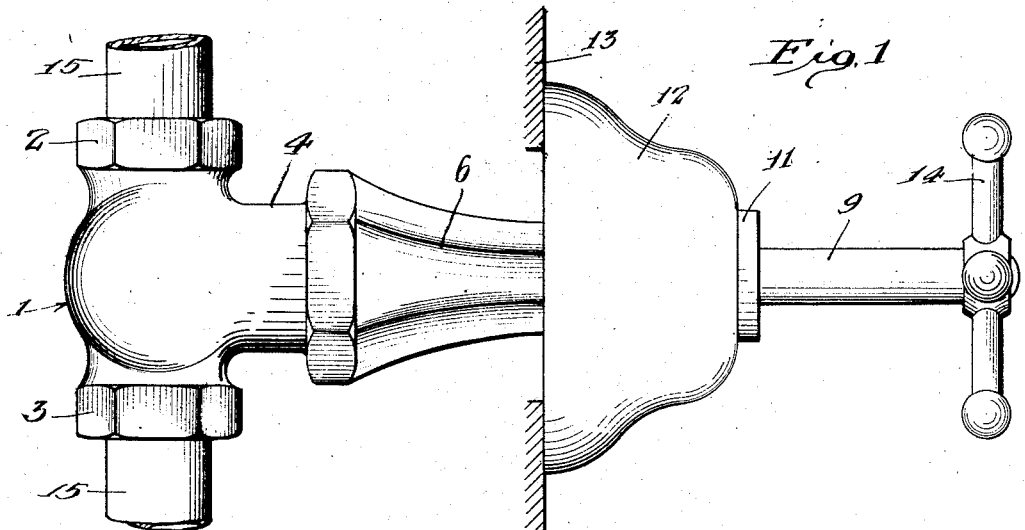
Figure 1 is a plan view of a partition valve embodying this invention.
Figure 2:
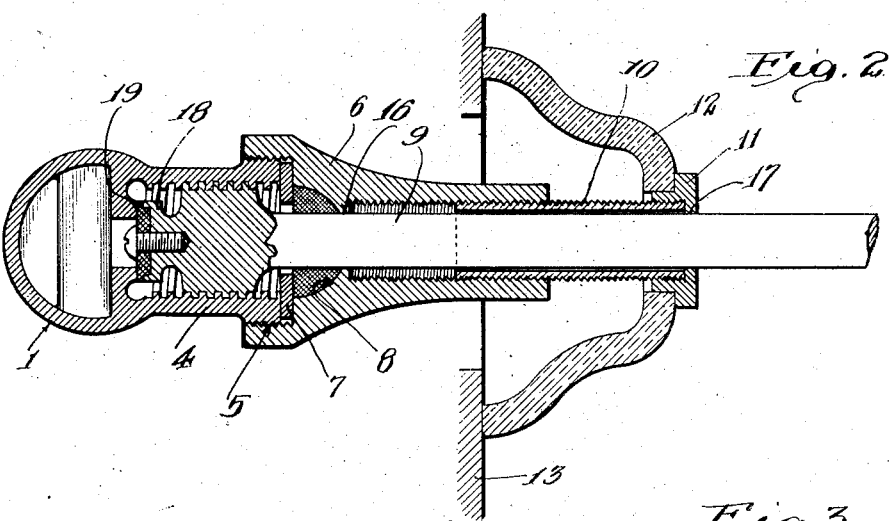
Fig. 2 is a central sectional side view thereof.
Figure 3:
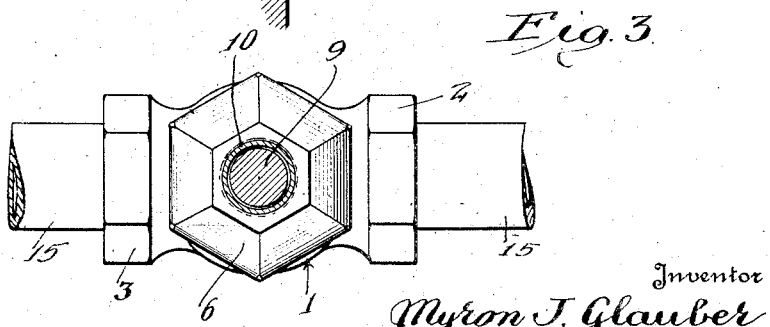
Fig. 3 is an end elevation thereof with the valve stem broken away.

In the preferred form of this invention 1 indicates a valve body internally threaded at its ends 2 and 3 and having a relatively short tubular branch 4, which tubular branch 4 is externally threaded as illustrated at 5. The valve 1 is of the ordinary construction and is practically the same as a globe valve and it is not deemed necessary to describe the construction of this valve which is familiar to those skilled in the art, it being, of course, understood that the other types of short body valves might be used in the place of the valve 1 illustrated in the drawings. The extension cap 6 is screw-threaded to the branch 4 and a lead washer 7, or other suitable packing, is positioned between the end faces of the members 4 and 6. A substantially conical packing recess 8 is formed in the cap 6 so that the packing cone may be positioned therein around the valve stem 9. The extension cap 6 is internally threaded to adjustably receive the threaded nipple 10 to which nipple 10 the escutcheon holder 11 is screw-threaded so as to hold the escutcheon 12 in position in relation to the wall or partition 13 of the building and the space in which the partition valve is to be used. The valve stem 9 is fitted at its outer end with a handle of any suitable construction or design, as illustrated at 14. The extension cap 6 is illustrated in the drawings as having six sides and as being tapered, the purpose of this being so that the same may receive a socket wrench of many various sizes when it is desired to remove the same to repack the valve or regrind the valve seat thereof, it, however, being obvious that the extension cap 6 might be constructed of any number of sides.

It will be obvious that the distance of the pipes 15 from the face of the walls or partitions of the building, may vary and that this particular partition valve is susceptible of a relatively large adjustment in position to meet the position of the pipes 15 and to maintain the escutcheon 12 in position upon the front face of the said wall 13 due to the peculiar construction thereof and the relatively great length of the internal threading of the extension cap 6 to adjustably receive the nipple 10. In order that the valve stem may be securely held from displacement within the fittings, the extension cap 6 provides the guide 16 for the said valve stem 9 and the escutcheon holder 11 provides the guide 17 spaced at a distance from the guide 16 so that the valve stem will be securely held and not allowed to oscillate within the fittings. This construction, in connection with the maintaining of the packing close to the valve seat 19, greatly increases the life of the valve as the same retains the valve head 18 in a definite relation to the said valve seat 19.

Having fully described the preferred embodiment of this invention, it is to be understood that applicant does not wish to be limited to the exact construction herein disclosed which may be obviously varied in detail without departing from the spirit of the invention as set forth in the appended claims.

I claim:

1. An article of the class described comprising a valve body having a relatively short tubular branch, a tapered extension cap screw threaded to the said short branch, said extension cap having a plurality of sides, and an escutcheon and means adapted to be secured to the said extension cap for maintaining the said escutcheon in position.

2. An article of the class described comprising a valve body having a relatively short tubular branch, a many sided extension cap screw threaded to the said short branch, a packing cone in the extension cap, a nipple screw threaded into the said extension cap and an escutcheon holder screw threaded to the said nipple adapted to engage an escutcheon.

3. An article of the class described comprising a valve body having a branch, an extension cap screw threaded to the said branch having a plurality of sides tapered throughout a portion of their length, an escutcheon and means secured to the said extension cap for maintaining the said escutcheon in position.

4. An article of the class described comprising a valve body having a tubular branch, a tapered extension cap secured to the said tubular branch, a packing cone positioned in the said extension cap at the end adjacent the said branch, an escutcheon and means secured to the said extension cap for maintaining the said escutcheon in position.

5. An article of the class described comprising a valve, a tapered extension cap secured to the body of said valve, a packing cone positioned in the said cap at the end adjacent to said valve body, a nipple secured to the said cap at its other end in adjustable relation, an escutcheon and means secured to the said nipple for maintaining the said escutcheon in position.

6. In an article of the class described, the combination of a valve having a valve and valve stem, an extension cap screw threaded to the body of said valve, said extension cap providing a guide at the end adjacent the said valve body for the said valve stem, a nipple screw threaded to the said extension cap, an escutcheon and means providing a valve stem guide spaced apart from the first stem guide for maintaining the said escutcheon in position.

7. In an article of the class described, the combination of a valve body having a relatively short tubular branch, a tapered extension cap screw threaded to the said branch and adapted to maintain a packing cone in position between the end faces of the said valve body and the said extension cap, a nipple screw threaded to the said extension cap, an escutcheon and means secured to the said extension cap for maintaining the said escutcheon in position.

8. An article of the class described comprising a valve body having a relatively short tubular branch, an extension cap screw threaded to the said short branch, a packing cone in the extension cap, a nipple adjustably screw threaded into said extension cap, and an escutcheon holder screw threaded to the said nipple adapted to engage an escutcheon.

9. An article of the class described comprising a valve, an extension cap secured to the body of said valve, a packing cone positioned in said cap at the end adjacent to said valve body, a nipple secured to the said cap at its other end in adjustable relation, and an escutcheon and means secured to said nipple to maintain said escutcheon in position.

Signed at Los Angeles, California, this 16th day of June 1924.

MYRON J. GLAUBER.